United States Patent [19] [11] 3,883,852
Cotter [45] May 13, 1975

[54] IMAGE SCANNING CONVERTER FOR AUTOMATED SLIDE ANALYZER

[75] Inventor: Douglas A. Cotter, Raleigh, N.C.

[73] Assignee: Corning Glass Works, Corning, N.Y.

[22] Filed: Apr. 20, 1973

[21] Appl. No.: 353,004

[52] U.S. Cl. .......... 340/172.5
[51] Int. Cl. .......... G06f 13/08; G06r 9/16
[58] Field of Search .......... 340/172.5, 146.3 R; 235/61.6 A

[56] References Cited

UNITED STATES PATENTS

| | | | |
|---|---|---|---|
| 3,296,594 | 1/1967 | Van Heerden | 340/172.5 |
| 3,315,229 | 4/1967 | Smithline | 340/146.3 R |
| 3,325,786 | 6/1967 | Shashoua et al. | 340/172.5 |
| 3,529,297 | 9/1970 | Landauer et al. | 340/172.5 |
| 3,566,396 | 2/1971 | Paine | 235/61.6 A |
| 3,598,963 | 8/1971 | Osugi et al. | 235/61.6 A |
| 3,644,714 | 2/1972 | Phillips et al. | 235/61.6 A |
| 3,705,383 | 12/1972 | Frayer | 340/146.3 R |
| 3,719,777 | 3/1973 | Von Reichenbach | 235/61.6 A X |

*Primary Examiner*—Raulfe B. Zache
*Assistant Examiner*—Jan E. Rhoads
*Attorney, Agent, or Firm*—Walter S. Zebrowski; Clarence R. Patty, Jr.; Richard E. Kurtz

[57] ABSTRACT

In an automatic slide analyzer an analog to digital converter is operated at the optimum speed while an address generator continuously generates the correct location in memory for the storage of the digital words. The image read-in system has a television type image scanning detector, a high speed analog to digital converter and an interface to a high capacity digital memory. The image of a leukocyte on a blood smeared slide is magnified and optically filtered. This image is scanned at conventional television rates by a vidicon camera tube. A timing pulse generator produces pulses which operate the analog to digital converter at the optimum time. An address generator concurrently generates digital addresses in the sequence in which the converted digital words are to be retrieved. In storage, digital words from successive scan lines are interleaved in the memory so they are in the correct order upon readout.

11 Claims, 10 Drawing Figures

IMAGE SCANNING CONVERTER FOR AUTOMATED SLIDE ANALYZER

BACKGROUND OF THE INVENTION

This invention relates to a system for converting an optical image to stored digital words and more particularly to such a system for an automated microscope slide analyzer.

In automated analysis of blood samples, pattern recognition techniques have been shown to be effective in distinguishing the normal adult types of leukocytes of the peripheral blood. See, J. W. Bacus, "An Automated Classification of the Peripheral Blood Leukocytes by Means of Digital Image Processing," Ph.D. Thesis, University of Illinois, 1971 and I. T. Young, "Automated Leukocyte Recognition," *Automated Cell Identification and Cell Sorting*, (G. L. Wied and G. F. Bahr, Eds.) New York, Academic Press, 1970, pp. 187–194. Pattern recognition algorithms are used to extract information from digitized images of Wright-stained blood smears. The pattern analysis and recognition emulate in a computer the hematology technician who performs cell classification. The ultimate application of the research on recognition schemes is the automation of the leukocyte differential count—a common, yet complex, manual task of a hospital's hematology laboratory.

SUMMARY OF THE INVENTION

In accordance with this invention an electronic system scans the optical image of the blood smeared slide, digitizes the optical density of each resolution element at the optimum speed of the converter, and stores the values in the correct location in digital memory.

An important advantage of this invention is that the high speed read-in of digital samples is economically obtained. This is accomplished by driving the analog to digital converter at the highest speed possible commensurate with the time required for the converter to perform each conversion. Also, the conversion rate is matches to the cycle time of the memory in which the digital words are stored. In doing this, the optical image is digitized at resolution points which are not in the sequence in which the digital words must be retrieved during playback. In accordance with this invention a memory address register generates addresses in a sequence which will correctly order the digitized words, so that upon readout, they will be in order.

The foregoing and other objects, features and advantages of the invention will be better understood from the following more detailed description and appended claims.

DESCRIPTION OF THE PREFERRED EMBODIMENT

Figure 1:
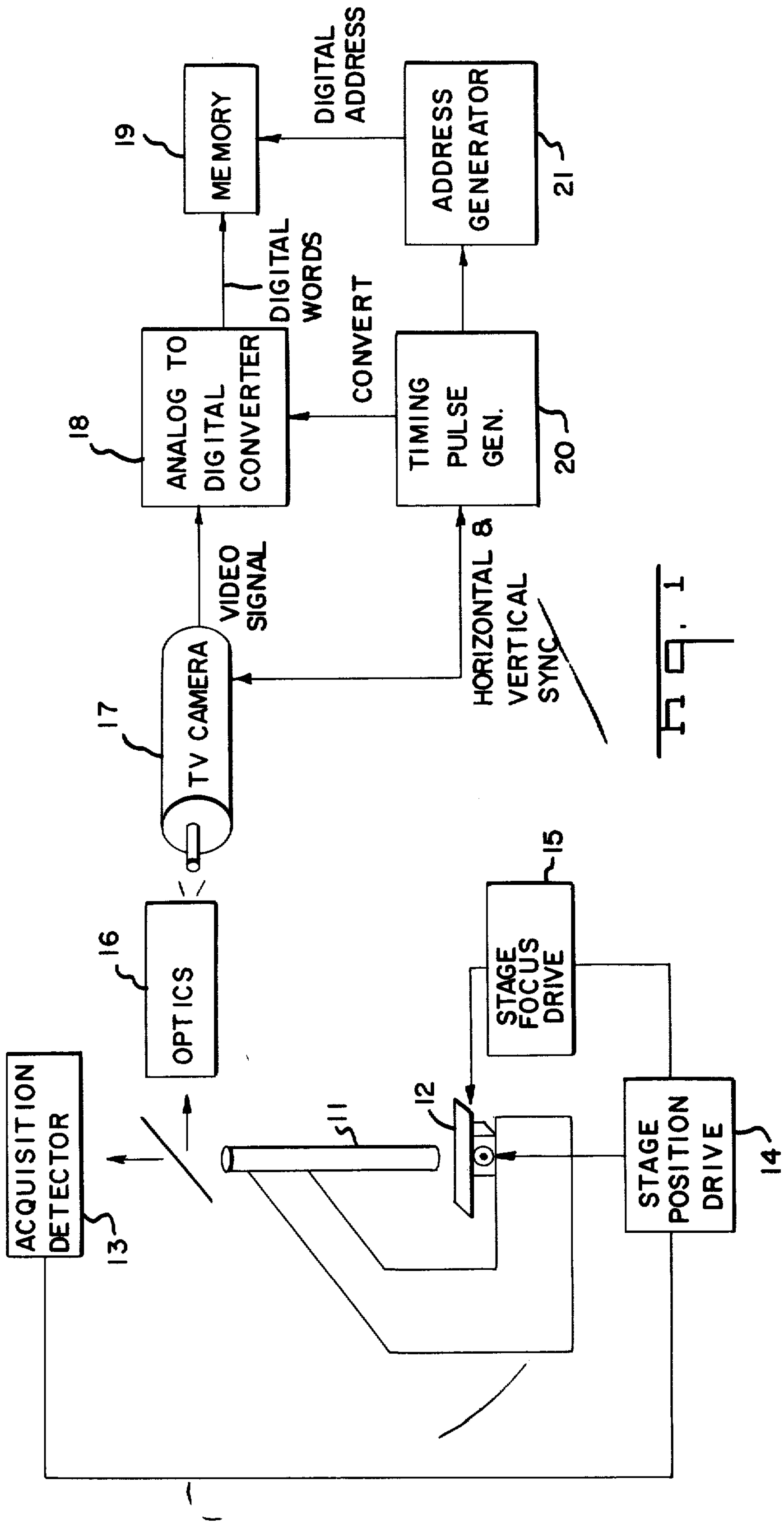
FIG. 1 is a block diagram of an automated microscope slide analyzer.

An Automated Slide Analysis System, FIG. 1

A high resolution microscope 11 brings the optical image of a microscope slide 12 to an appropriate size for scanning. A portion of the imaged light is applied to acquisition detector electronics 13 which automatically control the stage position drive 14 and the stage focus drive 15. The optics 16 apply the image of a blood cell to a vidicon type television camera 17.

The analysis is primarily directed to white blood cells (leukocytes) with diameters ranging from 8 to 15 microns. The cell is usually in a field of red blood cells (erythrocytes) with diameters of about 4 to 6 microns.

The blood sample is prepared by smearing a small quantity of blood on a standard glass slide to produce a uniform monolayer of cells. After drying, the smear is processed with Wright's stain or a similar mixture of methylene blue and eosin red which stains erythrocytes pink and the nuclei of leukocytes deeply violet. Cytoplasm regions of leukocytes stain differently, depending upon the cell type.

Since color information about the cell, as well as its size and shape, are characteristic of its class, a classification system must utilize color to extract significant information about the cell type.

A color television camera tube and the electronics to drive the tube are expensive. An alternative to a color camera can be achieved with a monochrome television system and two color filters. The stain mixture has only two characteristic peaks in the visible spectrum. Because of this, a blue and yellow optical filter placed in the optical path produce two gray-level pictures. These are representative of the spectrum existing on the stained slide.

Figure 2:
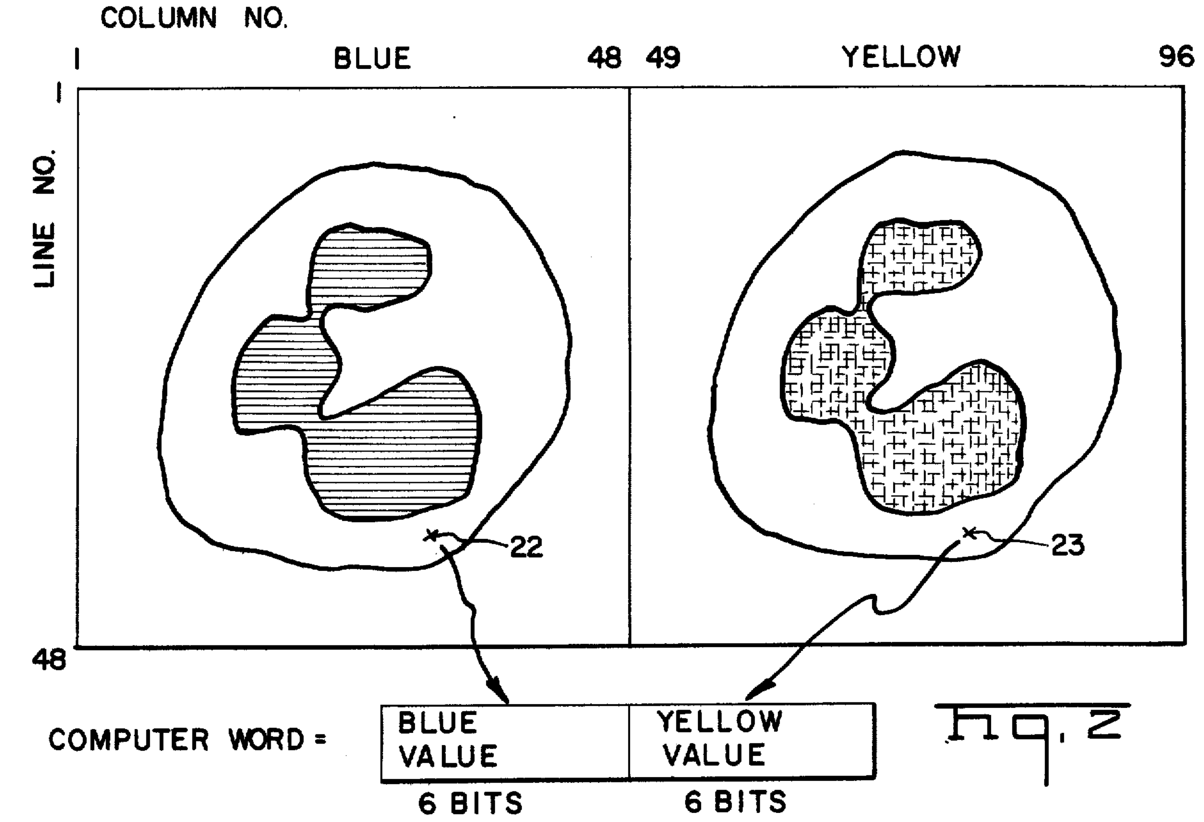
FIG. 2 shows the blue and yellow image of a leukocyte.

The optics 16 preprocess the optical image so that both the blue and yellow images are present simultaneously on the television vidicon image plane. FIG. 2 shows these two images in side-by-side position.

Figure 1A:
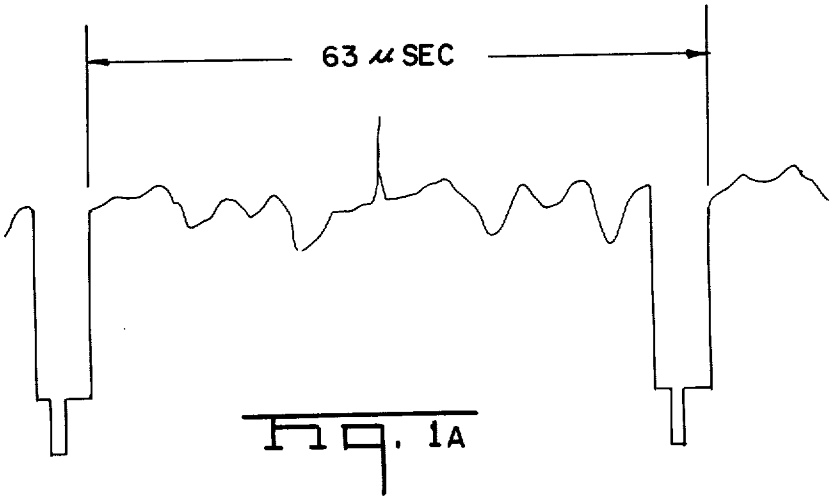
Figure 1B:
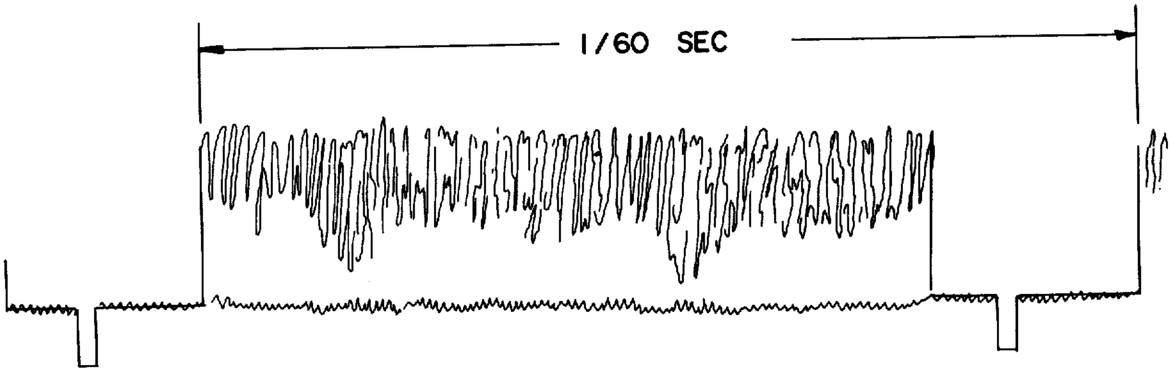

Television camera 17 is a standard monochrome T.V. monitor often referred to as a vidicon. The speed of the camera is one-sixtieth of a second per frame while each line is scanned in about 63 microseconds. FIG. 1A shows a typical television signal wave form with blanking pulses and horizontal sync pulses. FIG. 1B shows the image information and vertical sync pulses for one television frame, i.e., the scanning of a complete raster of scan lines. A typical frame is 262 horizontal scan lines. Although there are 63 microseconds for each horizontal line, only about 55 microseconds contain signal information. Similarly, in the vertical direction, only about 240 lines contain signal information. At the output of the television camera, the information signal is in the form of an analog voltage which varies within prescribed limits to indicate the amount of light striking the vidicon target at each instant in time. These are the wave forms shown in FIGS. 1A and 1B.

What has been described thus far is provided as background for the present invention. The present invention strips the information from the video signals and stores it in a digital memory such as the buffer memory of a digital computer. The video signal is applied to analog to digital converter 18. One straightforward way to operate this converter would be to digitize one point for each horizontal line for each vertical frame. This would require a conversion every 63 microseconds. FIG. 3A depicts this technique for digitizing a 48 × 48 resolution element image. In the first line of the first scan the resolution element identified by the numeral 1 is digitized; in the second line of the first frame resolution element 2 is digitized; in the third line resolution element 3 is digitized and so on through 48 lines. In the first line of the second frame resolution element 49 is digitized; in the second line, resolution element 50 is digitized and so on. This technique is straightforward but it is wasteful of time because most converters will operate at a faster rate.

The time required to convert the entire image depends on the number of horizontal resolution elements. For an image with 48 resolution elements the time required is 48/60 or 0.8 seconds for each 48 × 48 image or 1.6 seconds for two such images.

Another conversion technique in use is faster and will convert the entire image in one-sixtieth of a second. This is a point-by-point conversion of each resolution element in each horizontal line. This requires a conversion every 63/$n$ microseconds where $n$ is the number of horizontal resolution elements. Where 48 horizontal resolution elements are required for each image and there are two images, this requires a conversion every 0.65 microseconds. Analog to digital converters whose speed is in the submicrosecond region cost at least an order of magnitude more than converters in the several microsecond conversion region. This would not fit the cost criteria for automated microscope slide analyzers.

Another difficulty in the rapid conversion speed is the cycle time limitation of the core memory of digital computers. Cycle times are greater than 1 microsecond and typically run 10–20 microseconds for data input under programmed control. This is incompatible with a submicrosecond conversion speed.

Applicant's Invention, Converting at Optimum Times and Matching Memory Cycle Time In accordance with this invention the analog to digital converter is driven at a speed which is commensurate with its capability and which is matched to the cycle time of the memory 19. A timing pulse generator 20 generates the timing pulses which cause the converter to digitize. Simultaneously, an address register 21 generates digital addresses specifying the memory location at which the digital words are to be stored.

In the example being described the analog to digital converter 18 is a commercially available device supplied by Burr-Brown Research Corporation. The memory 19 is included in a Digital Equipment Corporation PDP — 8*e* minicomputer.

The computer word length is 12 bits. One memory location represents corresponding points in each of the blue and yellow images. As depicted in FIG. 2, a single 12-bit word represents the resolution point 22 in the blue image and the resolution point 23 in the yellow image. The total core memory required for an image of 48 × 48 points is 2,304 words.

The analog to digital converter 18 performs a 6 bit conversion in about 10 microseconds. In accordance with this invention the converter is operated close to its optimum conversion speed. The most efficient conversion rate would be to perform 63/10 or 6.3 conversions per horizontal line. In the example being described there are four conversions per line thereby providing a safety margin in timing.

Figure 4:
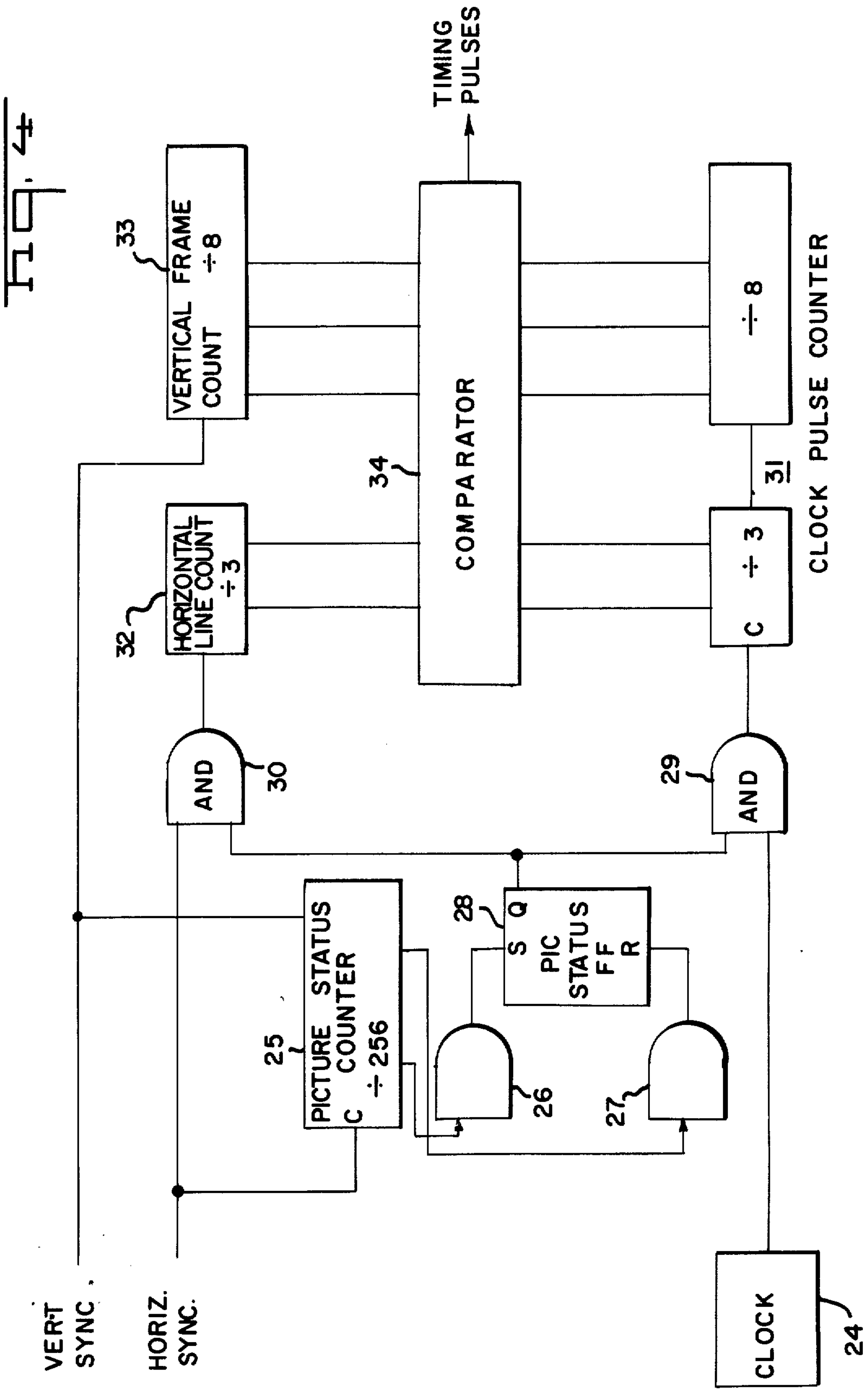
FIG. 4 is a schematic diagram of the timing pulse generator.

The Timing Pulse Generator, FIG. 4

FIG. 4 shows the timing pulse generator. A system clock 24 operates at 2,016 kHz to provide clock pulses each 0.496 microseconds. This clock signal can also provide the synchronizing pulses to the television sweep circuit since $$2{,}016 \text{ kHz} \times 2^{-7} = 15.75 \text{ kHz}$$

the horizontal sweep frequency.

The horizontal sync pulses are applied to the picture status counter 25. The field of the television camera is greater than the image field which is actually converted. The field of the television camera has 262 scan lines. The image field includes only lines 62 through 206. The outputs of the picture status counter 25 are decoded by gates 26 and 27 to set the picture status flip flop 28 at the beginning of line 62 and to reset this flip flop after line 206.

The output of flip flop 28 is applied to AND gates 29 and 30. When flip flop 28 is set clock pulses are applied to a clock pulse counter 31 and horizontal sync pulses are applied to the horizontal line counter 32. The counter 32 provides the index for consecutive horizontal lines. Vertical sync pulses are applied to the vertical frame counter 33 which determines which vertical column is selected. Comparator 34 compares the outputs of the horizontal frame counter 32 and vertical frame counter 33 with the outputs of the clock pulse counter 31. Comparator 34 produces a timing pulse each time the outputs of the horizontal line counter 32 and vertical frame counter 33 correspond with, or match, the outputs of the clock pulse counter 31.

Comparator 34 includes five two input exclusive OR gates whose output is 1 if both inputs are logically equal. The comparator output is the logical AND of the outputs of the five exclusive OR gates. The comparator 34 produces timing pulses which occur at different times relative to three successive scan lines. This will be better understood after the following description of the format of the resolution points which are digitized by these timing pulses.

Figure 3:
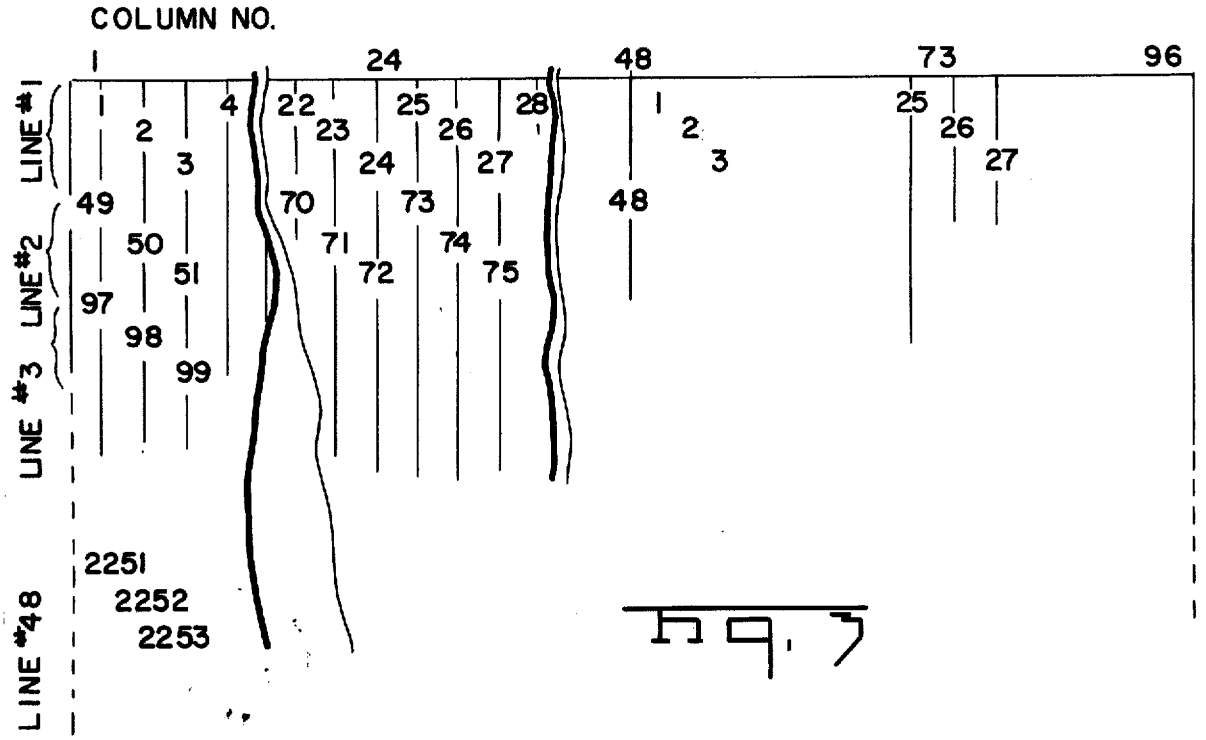
FIG. 3 depicts the storage location of each resolution element in the images.
Figure 7A:
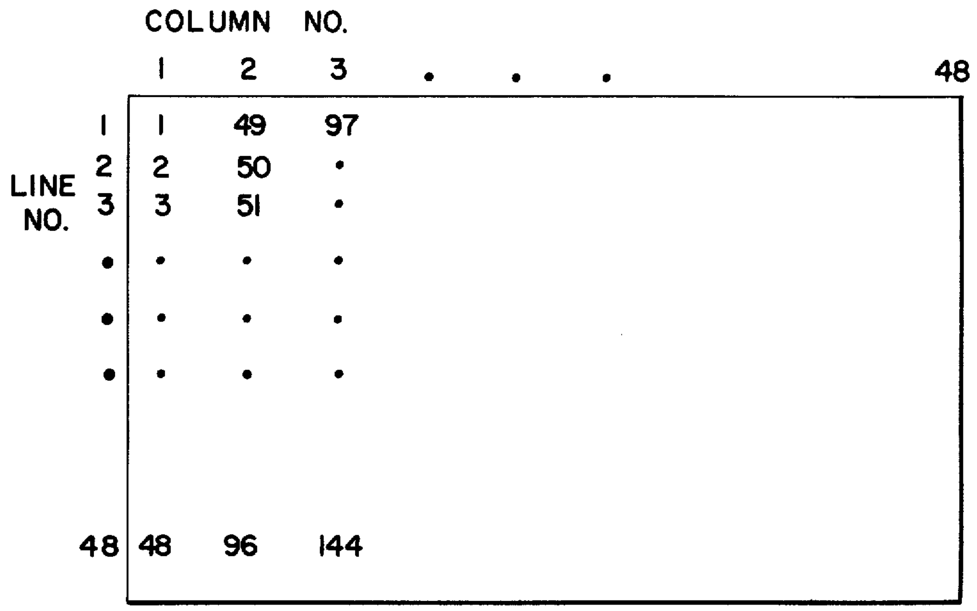
FIG. 7A (PRIOR ART)
FIG. 7 depicts the operation of the address generator.

Resolution and Image Format, FIG. 3

Scanning resolution is determined by selecting the number of conversion points per image. Using the system clock, 96 points can be digitized across each line in exactly $$96 \times 0.496 \times 10^{-6} \text{ seconds} = 47.6 \times 10^{-6} \text{ seconds}$$

This gives a horizontal optical scanning resolution of 48 points within 20 microns. The resolution is:

$$\frac{20 \text{ micron}}{48 \text{ lines}} = 0.416 \text{ micron per point.}$$

The vertical resolution is determined by the number of horizontal lines intercepted by the 20-micron aperture. This number is approximately $n_h$ where $$\text{where} \quad n_h = \left(\frac{\text{no. horiz lines}}{\text{vert line}}\right)\left(\text{aspect ratio}\right)\left(\frac{\text{horiz digit time}}{\text{horiz sweep time}}\right)$$

$$= (262)\ (3/4)\ \left(\frac{47.6}{63.3}\right)$$

$$= 148 \text{ lines per frame}$$

This yields a vertical resolution of $$\frac{20 \text{ micron}}{148 \text{ lines}} = 0.135 \text{ micron per line}$$

The vertical resolution is approximately triple the horizontal resolution.

In order to take advantage of the over-resolution in the vertical field, this invention utilizes the resolution to increase read-in speed. Assuming that the optical resolution is no better than 0.25 micron, then two consecutive horizontal lines will digitize into exactly the same values. An extension of this over-resolution in the television scanning system is a tripling of the number of read-in points by using three horizontal television lines to represent one horizontal resolution line.

The vertical resolution will therefore be 48 × 3 = 144 horizontal lines in the 20-micron field.

The two-color image format shown in FIG. 3 describes the 48 × 96 resolution elements. In FIG. 3 the numerals represent the storage location at which digitized words representing the image are stored. These numerals will also be used here to designate the resolution point. During the first horizontal scan line resolution points 1 and 25 in the blue image and points 1 and 25 in the yellow image are digitized. (These resolution points are in columns 1, 25, 49 and 73 respectively.) During the second scan line of the first frame the timing pulses occur at different times relative to the first line so that the digitized resolution points are displaced one column to the right. During the second scan line resolution points 2 and 26 in the blue image and 2 and 26 in the yellow image are digitized. (These resolution points are in columns 2, 26, 50 and 74 respectively.) During the third scan line resolution points 3, 27, 3 and 27 are digitized. (These are in columns 3, 27, 51 and 75 respectively.) The digitized samples from these three scan lines form one resolution line and the words are retrieved from memory in the order of their address to form this resolution line.

On the fourth scan line resolution elements 49, 73, 49 aand 73 (columns 1, 25, 49 and 73) are digitized. On the fifth scan line elements 50, 74, 50 and 74 are digitized. This continues with the resolution points in these successive lines being displaced one column to the right with respect to the previously scanned line. Stated another way the timing pulses occur one clock pulse increment later in each succeeding scan line of three successive lines. This continues through the scanning of a complete frame.

On the next frame the resolution elements digitized are shifted three columns to the right with respect to those digitized in the preceding frame. That is, in the second frame, in the first scan line resolution points 4, 28, 4 and 28 (columns 4, 28, 52 and 76) are digitized. The scan lines in the second frame continue with the digitized resolution elements being three columns to the right of the resolution elements which were digitized in the first frame.

Now consider the operation of the circuit of FIG. 4. Initially the outputs of counters 32 and 33 are all zeros. The outputs of counter 31 are zeros. The comparator 34 produces the timing pulse which digitizes the resolution element 1 in the first column of FIG. 3.

The counter 31 now counts clock pulses. It will not match the outputs of counters 32 and 33 until the counter 31 counts through 24 pulses. On the 25th pulse the counter 31 goes to all zeros. There is a comparison again. A timing pulse is produced at the point 25 in the first line of FIG. 3.

On the same line the 49th clock pulse produces a comparison to digitize the yellow image at the resolution element 1 and the 73rd pulse digitizes the resolution element 25 in the yellow image.

The horizontal sync pulse increments the value of the counter 32 to produce the binary count 10,000. At the first pulse of the second line counter 31 is set to 00 000. At the second pulse of the second line the counter 31 is set to 10,000 to give a comparison.

On the fourth horizontal line the counter 32 rolls back to all zeros. The operation proceeds through the line 206 when the AND gates 29 and 30 are disabled.

A vertical retrace occurs. The vertical sync pulse increments the vertical frame counter 32 so the outputs of counters 32 and 33 are 00 100. The counter 31 is 00 000 initially. On the fourth clock pulse counter 31 outputs are 00 100. This equals the output of counters 32 and 33. The first resolution element in the second column is digitized.

Storing the Digitized Words

The scrambled image format created by the rapid picture read-in presents a problem in data organization for the memory which must store the image. Since the blue and yellow data are packed into a single computer word, the addresses of a 48 × 48 point image are 1, 25, 2, 26, etc. The input sequence is known and can be determined algorithmically. Either of two alternative approaches in unscrambling the data could be used: (1) Store the data as it is taken in real time and calculate the sequential address from the actual address whenever data is required from the memory; or (2) calculate the actual address from the sequential address as the data is taken, and address the memory directly as data is required.

The first approach noted above implies a lengthy subroutine to be executed for each point in the image. This would add an excessive amount of calculating time to the run. The second approach noted above can be implemented in hardware or software. Software computation of the actual address must be performed real time. Since only 24 microseconds are available for the subroutine execution, this is not usually feasible. The address generator of this invention calculates the actual address at each point in the image and presents the address to the computer prior to giving it the data for that address. This real time generator assures the accuracy of image storage while preserving the rapid picture read-in.

Figure 5:
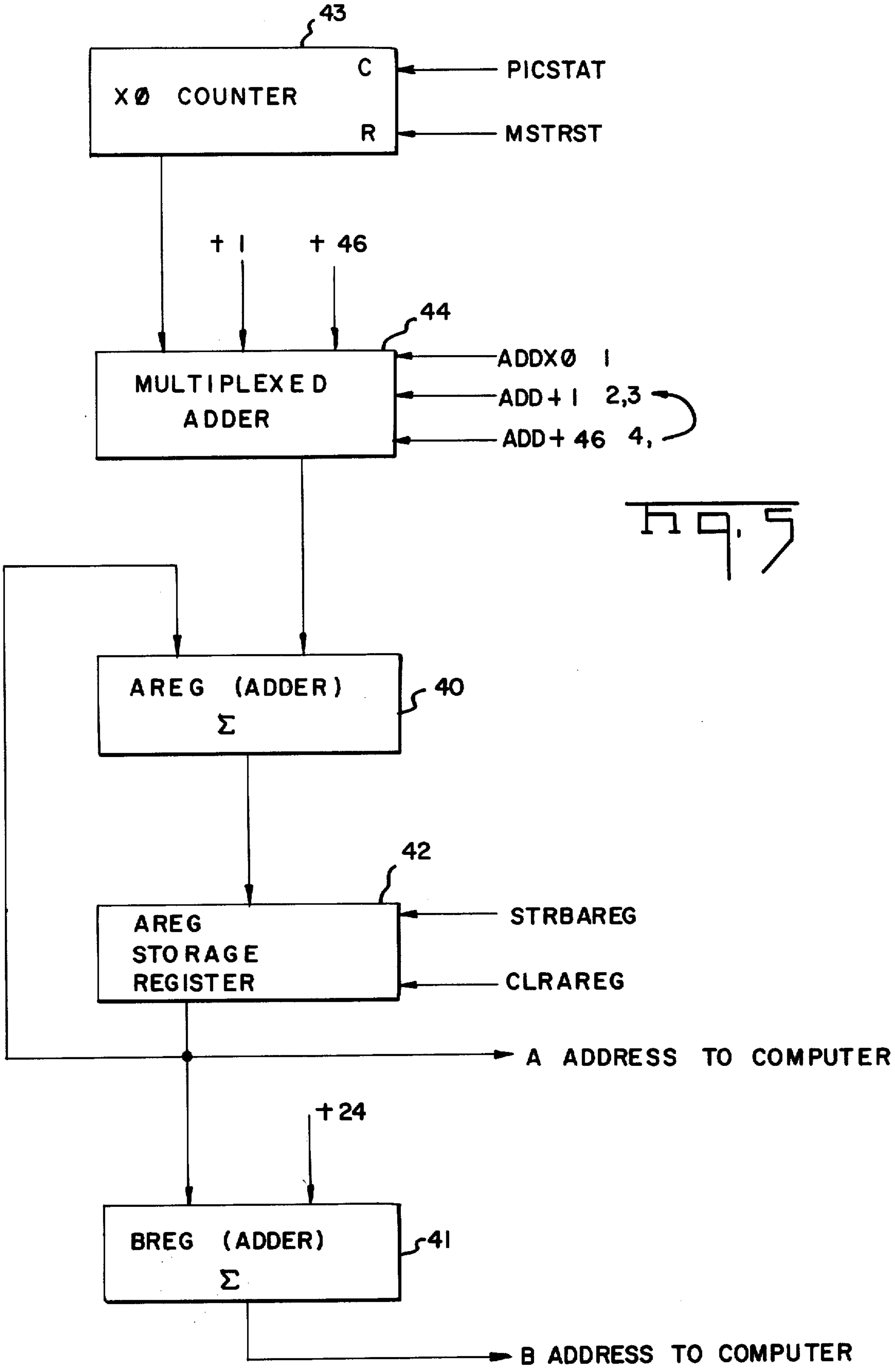
FIG. 5 is a schematic diagram of the address generator.
Figure 6:
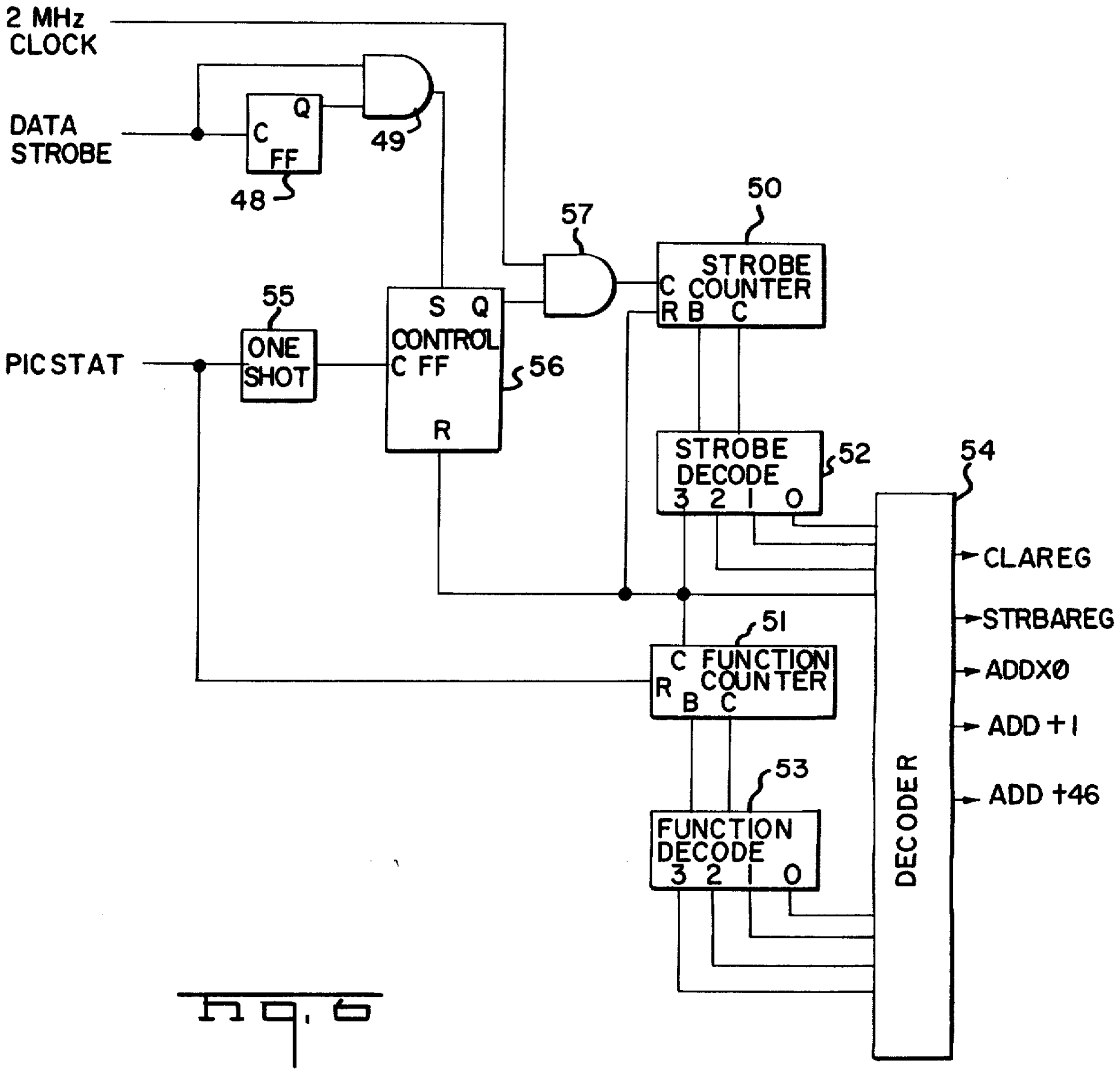
FIG. 6 is a schematic diagram of the controls for the address generator.
Figure 7:
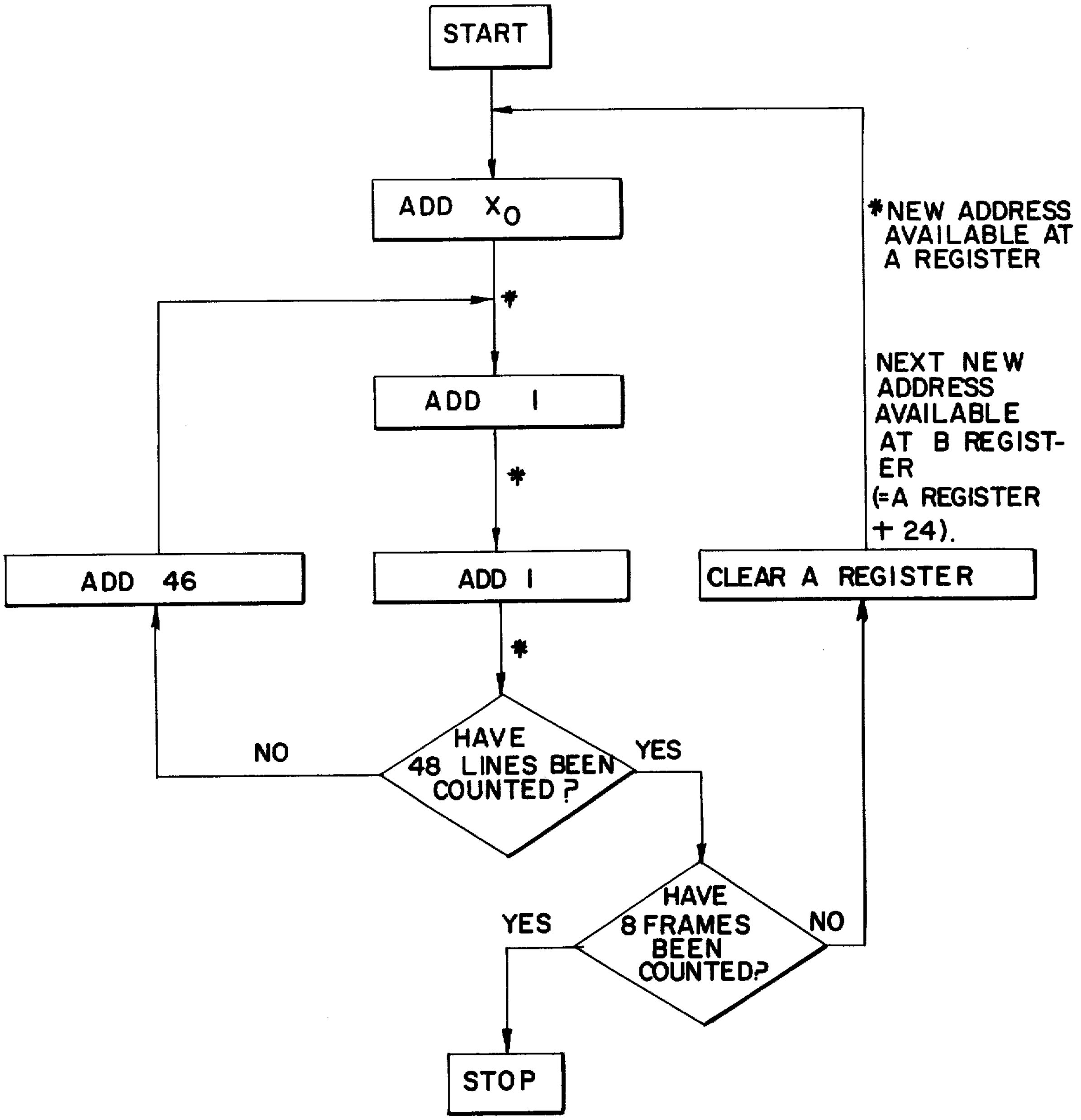

Address Generator, FIGS. 5, 6 and 7

The address generator includes two 12-bit full adders 40 and 41, a storage register 42, a counter 43 and an addend multiplexer 44. Addend multiplexer 44 provides to the adder 40 (through the addend input) the value $X_o$, +1, or +46 as determined by the control signals. The devices 40 and 44 combined form a multiplexed adder where 44 is the multiplexer and 40 is the adder.

The counter 43 (designated the $X_o$ counter) counts in the sequence 1, 4, 7, 10, 13, 16, 19, 22 and provides starting addresses for each TV frame. The full adder 40 (designated AREG) can accept the $X_o$ counter input, a constant +1 input, or a constant +46 input. All of these are under control of the address generator control logic shown in FIG. 6. The AREG 40 is followed by a storage register 42 including 12 Type D flip flops. The outputs of the AREG 40 are held by the storage register 42, and this output is in all cases added to the constant numbers which are present at the multiplexed input of the adder 40. The outputs of adder 40 are also applied to another 12-bit full adder 41 (BREG) where a constant +24 is added. This means that the BREG in all cases follows the AREG by +24.

The address generator requires vertical and horizontal synchronizing pulses, picture status, and timing pulses as inputs. The operation is as follows: Starting at the first point in the frame, each successive address is found by adding 1, 1 and 46 then repeating the sequence for the next three points; the entire sequence is repeated 48 times for each frame; the address of every other word is produced by adding 24 to the previous address. Each frame starts with a point three greater than the previous frame (i.e., 1, 4, 7, . . . ).

A clearer explanation of this operation is given in the diagram of FIG. 7. Each asterisk in the figure indicates that two new addresses have been calculated and are available at the A and B registers respectively.

Address Generator Control, FIG. 6

The DATA STROBE pulse is produced by the memory indicating it is available to accept data. Upon the occurrence of this pulse the flip flop 48 is set and the control flip flop 56 is enabled. The next occurring rising edge of PICSTAT sets the control flip flop 56. (The signal PICSTAT is produced by the flip flop 28 in FIG. 4. It occurs at the beginning of each image frame.)

Flip flop 56 enables the AND gate 57 to pass 2 MHz clock pulses to the strobe counter 50. On the fourth pulse the signal CLAREG is produced which is applied to A register 40 (FIG. 5) to clear it.

On the 12th clock pulse, the signal ADDXO is produced. This causes the multiplexer 44 to add the contents of $X_o$ counter 43 to the A register 40. After 16 clock pulses the function counter 51 is indexed to one and the control flip flop 56 is reset thus terminating the application of clock pulses to the stroke counter 50. Resetting the control flip flop 56 also resets the strobe counter 50 to "0".

On the second DATA STROBE from the memory, the control FF 56 is set, and +1 is added to the AREG 40. On the fourth DATA STROBE, +1 is added to AREG 40 again. On the sixth DATA STROBE, +46 is added, and the function counter is indexed from 3 to 1. This +1, +1, +46 sequence is repeated until PICSTAT falls. When PICSTAT falls, the $X_o$ counter 43 is indexed by +3 and is ready to start the next frame.

The operation of the address generator and its control is summarized below. With all counters zeroed, the control logic is set up to clear the AREG 40 by the signal CLAREG. Then the contents of the $X_o$ counter 43 are added to the AREG 40. In all cases, the AREG 40 is strobed by the pulse designated by STRBAREG some 100 nsec after the addend is presented to the full adders.

Below is a table showing the various functions performed for the state of the function counter:

| Function Counter | Strobe Counter | Function Performed |
|---|---|---|
| 0 | 1 | Clear AREG |
| | 3 | Add $X_o$ then STRB AREG |
| 1 | 1 | No function |
| | 3 | Add +1 then STRB AREG |
| 2 | 1 | No function |
| | 3 | Add +1 then STRB AREG |
| 3 | 1 | No function |
| | 3 | Add +46 then STRB AREG |

Below is a chart of $X_o$ and the first few addresses of all eight frames:

| Frame No. | $X_o$ | AREG | BREG | AREG | BREG | AREG | BREG | AREG | BREG | AREG | BREG |
|---|---|---|---|---|---|---|---|---|---|---|---|
| 1 | 1 | 1 | 24 | 2 | 25 | 3 | 26 | 49 | 73 | 50 | 74 |
| 2 | 4 | 4 | 28 | 5 | 29 | 6 | 30 | 52 | 76 | 53 | 77 |
| 3 | 7 | 7 | 31 | 8 | 32 | 9 | 33 | 55 | 79 | 56 | 80 |
| 4 | 10 | 10 | 34 | 11 | 35 | 12 | 36 | 58 | 82 | 59 | 83 |
| 5 | 13 | 13 | 37 | 14 | 38 | 15 | 39 | 61 | 85 | 62 | 86 |
| 6 | 16 | 16 | 40 | 17 | 41 | 18 | 42 | 64 | 88 | 65 | 89 |
| 7 | 19 | 19 | 43 | 20 | 44 | 21 | 45 | 67 | 91 | 68 | 92 |
| 8 | 22 | 22 | 46 | 23 | 47 | 24 | 48 | 70 | 94 | 72 | 95 |

Read-in Algorithm

The computer program for reading-in the picture is controlled through a flag-setting operation based on the hold-pulse timing. A flat (signal) is raised in the computer interface about 10 usec after each hold pulse (to provide time for the analog to digital conversion). This flag is recognized in the program as an interrupt which notifies the computer that an address and data are available at the interface. After the computer reads the address, the data is then read and stored at that address. The program then indexes a point counter and checks the counter to see if all points have been read-in from the image (2,304 points). If more points are needed, the computer jumps back to the waiting loop looking for another flag. A listing of the coding for the read-in algorithm follows.

Picture Read-In Subroutine

```
INPUT1,   SKPDTA        /Test for flag, skip if data
                        ready.
          JMP INPUT1    /Loop until flag is set.
          GETADR        /Get address.
          TAD KFIRST    /And add it to base (relative ADR
```

–Continued

| Picture Read-In Subroutine | |
|---|---|
| | + base = actual ADR1 |
| DCA PTR1 | /Save core address. |
| GET DTA | /Get data word. |
| DCA 1 PTR1 | /Store it at core address. |
| ISZ CNT1 | /End? Skip if yes. |
| JMP INPUT1 | /Loop if not. |
| STOPIC | /Stop picture input. |

While a particular embodiment of the invention has been shown and described modifications will be apparent. The appended claims are, therefore, intended to cover any such modifications.

What is claimed is:

1. A system producing stored digital words representing the optical characteristics of an analytical slide comprising:

means for producing an optical image of said analytical slide, a scanning detector for sequentially scanning at least a portion of said optical image of said slide in a raster of scan lines to produce an analog electrical signal representing said optical image along said scan lines, an analog to digital converter responsive to a timing pulse input for producing a digital word representing the magnitude of said analog signal at the occurrence of each timing pulse, an addressable memory for storing each digital word at memory locations specified by a digital address supplied thereto, a timing pulse generator for generating said timing pulses, said timing pulses being applied to said analog to digital converter at intervals commensurate with the conversion rate at which said analog to digital converter performs each conversion, said conversion rate being matched with the cycle time of said memory, said timing pulses occurring at different times relative to at least two successive scan lines, and an address generator for generating the digital address at which each digital word is to be stored, said digital address being applied to said memory for storing each digital word.

2. The system recited in claim 1 wherein said digital words are stored in the sequence in which they are to be retrieved by interleaving digital words from the successive scan lines in which said timing pulses occur at different times.

3. The system recited in claim 2 further comprising:

a multiplexed adder, the output of said adder being the address at which said digital word is stored in said memory, and address control logic circuitry producing control signals which are applied to said adder, said control signals operating said adder to produce successive addresses which interleave said digital words from successive scan lines so that said digital words are stored in the sequence in which they are to be retrieved.

4. The system recited in claim 2 wherein two optical images are formed of the material on the slide which is to be analyzed, said two images being formed through different colored filters, said address generators generating digital addresses for storing the corresponding points in each of said two images at the same address in said memory.

5. The system recited in claim 2 further comprising:

means to generate a horizontal sync pulse after each of said scan lines and a vertical sync pulse upon the completion of each raster, said timing pulse generator comprising:

a source of clock pulses occurring at a repetition rate greater than that of said timing pulses, a clock pulse counter, said clock pulses being applied to said counter to increment said counter during the scanning of each raster, a vertical frame counter, said vertical sync pulses being applied to said vertical frame counter, a horizontal line counter, said horizontal sync pulses being applied to said counter to increment it during the scanning of each raster, and a comparator, the outputs of said horizontal frame counter and said vertical frame counter being applied to said comparator, the outputs of said clock pulse counter being applied to said comparator, said comparator producing a timing pulse each time the outputs of said horizontal line counter and said vertical frame counter correspond with the outputs of said timing pulse counter.

6. The system recited in claim 5 wherein the image field of scan lines over which said analog signal is converted is smaller than the raster field of said detector further comprising:

a picture status counter, said horizontal sync pulses being applied to said counter, a picture status flip flop, said flip flop being set by the output of one stage of said picture status counter which stage corresponds with the horizontal lines at which said picture image field beings, said flip flop being reset by a subsequent stage of said picture status counter corresponding with the horizontal line with which said image field terminates, the output of said flip flop controlling the application of said horizontal sync pulse and said clock pulses to said horizontal line counter and to said clock pulse counter respectively.

7. A system for converting an optical image to stored digital words comprising:

means for producing an optical image of said analytical slide, a scanning detector for sequentially scanning at least a portion of said optical image in a raster of scan lines to produce an analog electrical signal representing said optical image along said scan lines, an analog to digital converter responsive to a timing pulse input for producing a digital word representing the magnitude of said analog signal at the occurrence of each timing pulse, an addressable memory for storing each digital word at memory locations specified by a digital address supplied thereto, a timing pulse generator for generating said timing pulses, said timing pulses being applied to said analog to digital converter at intervals commensurate with the conversion rate at which said analog to digital converter performs each conversion, said conversion rate being matched with the cycle time of said memory, said timing pulses occurring at different times relative to at least two successive scan lines, and an address generator for generating the digital address at which each digital word is to be stored, said digital address being applied to said memory for storing each digital word.

8. The system recited in claim 7
wherein said digital signals are stored in the sequence in which they are to be retrieved by interleaving digital words from the successive scan lines in which said timing pulses occur at different times.

9. The system recited in claim 8 wherein said address generator comprises:
a multiplexed adder, the output of said adder being the address at which said digital word is stored in said memory, and
address control logic circuitry producing control signals which are applied to said adder, said control signals operating said adder to produce successive addresses which interleave said digital words from successive scan lines so that said digital words are stored in the sequence in which they are to be retrieved.

10. The system recited in claim 6 further comprising:
means to generate horizontal sync pulse after each of said scan lines and a vertical sync pulse upon the completion of each raster, said timing pulse generator comprising:
a source of clock pulses occurring at a repetition rate greater than that of said timing pulses,
a clock pulse counter, said clock pulses being applied to said counter to increment said counter during the scanning of each raster,
a vertical frame counter, said vertical sync pulses being applied to said vertical frame counter,
a horizontal line counter, said horizontal sync pulses being applied to said counter to increment it during the scanning of each raster, and
a comparator, the outputs of said horizontal frame counter and said vertical frame counter being applied to said comparator, the outputs of said clock pulse counter being applied to said comparator, said comparator producing a timing pulse each time the outputs of said horizontal line counter and said vertical frame counter correspond with the outputs of said timing pulse counter.

11. The system recited in claim 10 wherein the image field of scan lines over which said analog signal is converted is smaller than the raster field of said detector further comprising:
a picture status counter, said horizontal sync pulses being applied to said counter,
a picture status flip flop, said flip flop being set by the output of one stage of said picture status counter which stage corresponds with the horizontal line at which said image field begins, said flip flop being reset by a subsequent stage of said picture status counter corresponding with the horizontal line with which said image field terminates, the output of said flip flop controlling the application of said horizontal sync pulse and said clock pulses to said horizontal line counter and to said clock pulse counter respectively.

* * * * *